June 16, 1936.  C. W. STEWARD  2,044,338

RETRACTABLE LANDING GEAR

Filed Sept. 18, 1933

INVENTOR.
COLBY W. STEWARD.
BY
ATTORNEYS.

Patented June 16, 1936

2,044,338

UNITED STATES PATENT OFFICE 2,044,338

RETRACTABLE LANDING GEAR

Colby W. Steward, Manchester, Conn., assignor to Curtiss Aeroplane & Motor Company, Inc., a corporation of New York Application September 18, 1933, Serial No. 689,826

7 Claims. (Cl. 244—2)

This invention relates to improvements in retractable landing gears for aircraft.

An object of the invention is to provide a landing gear particularly adapted to low wing aircraft, or aircraft having wings extending from a lower portion of the aircraft body.

A further object is to provide a retractable landing gear which, when retracted, will lie wholly within the body of the aircraft, thereby reducing drag and aiding in the increase of speed.

A further object is to provide a form of landing gear in which certain of the members, when in the retracted position, form a portion of the leading edge of the wing.

Another object is to provide a landing gear wherein the ground contact elements in their retracted position are housed within the aircraft body, wherein certain of the structural members of the gear are housed within the aircraft body, and wherein certain other of the structural members of the gear lie outside of the aircraft, but in a position adjacent the leading edge of the wing where no increase in drag may be induced.

A still further object is to provide suitable mechanism for retracting and extending the landing gear.

Further objects will be apparent from a perusal of the annexed specification and drawing.

Briefly, the landing gear comprises two halves, one on either side of the plane of symmetry of the aircraft. Each side of the landing gear is similar. A shaft is journaled on a fore and aft axis in the wing, a short distance from the body, this shaft extending forwardly through the leading edge of the wing and carrying at its forward end a substantially right-angled member which may readily incorporate the shock absorbing mechanism for the landing gear. This member carries a wheel at its lower end and has hinged thereto a strut which extends substantially to the plane of symmetry of the aircraft where it is attached to a suitable retracting mechanism such as a lead screw or the like. In an extended position, the wheel carrying member depends from the leading edge of the wing wherein the wheel is in a ground contacting position, and wherein the retracting strut extends outwardly and downwardly from the aircraft body. Upon withdrawal of the retracting strut, the wheel carrying member is drawn upwardly and inwardly to a position wherein the wheel is housed within the aircraft body and wherein said member lies adjacent and parallel to the leading edge of the wing. In such position, the member forms a substantial continuation of the leading edge of said wing, whereupon it offers no more drag than would be inherent in the wing itself.

For a clearer understanding of the invention, reference may be made to the drawing, in which.

Figure 1:
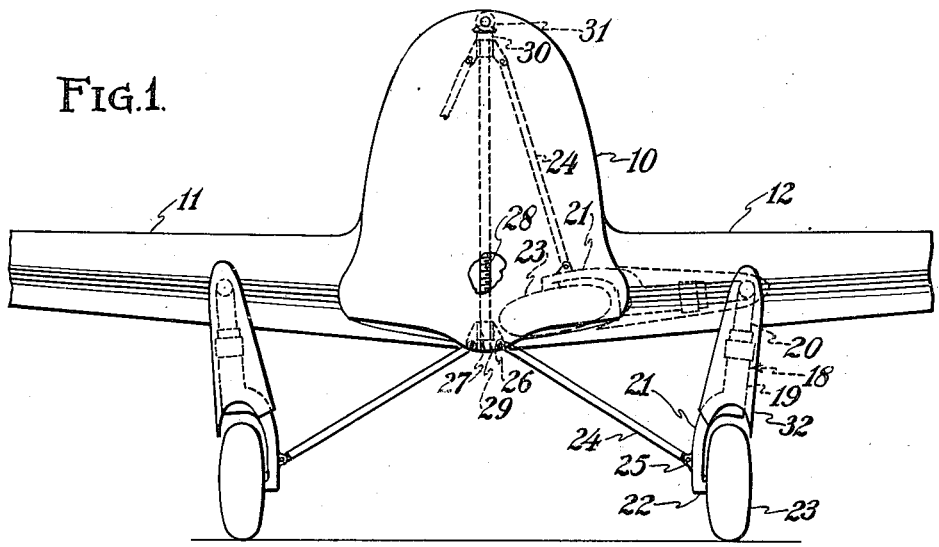
Fig. 1 is a front elevation of a portion of an airplane embodying the landing gear of this invention, showing the landing gear in its extended position.
Figure 2:
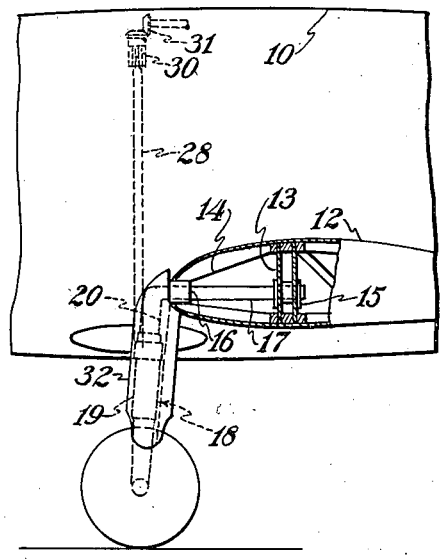
Fig. 2 is a partial side elevation of an airplane embodying the landing gear, showing the landing gear in its extended position and showing a portion of the wing in section.
Figure 3:
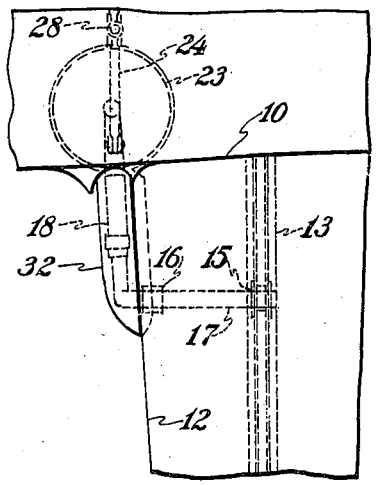
Fig. 3 is a plan of a portion of an airplane showing the landing gear in its retracted position.

The airplane comprises a fuselage 10 from the lower portion of which a pair of wings 11 and 12 extend laterally. As both sides of the landing gear are identical, a detailed description thereof will be made with reference to the wing 12. Said wing includes a forward spar 13 having 20 wardly extending structural bracing 14 which supports the leading edge portion of the wing. The spar 13 and the bracing 14, respectively, carry bearings 15 and 16 on a fore and aft axis, and in these bearings a shaft 17 is journaled, this shaft extending ahead of the leading edge of the wing 12. Substantially at right angles to the shaft 17, a strut member 18 is rigidly attached, this member conveniently including a shock absorbing mechanism of any of several well known constructions, wherein 19 is a movable element and 20 is a relatively stationary element. At the outer end of the member 18 a yoke 21 is fixed, which in turn carries a wheel axle 22 on which a wheel 23 is mounted for rotation. To the yoke 21, a strut 24 is pivoted as at 25, this strut extending upwardly and inwardly, when the landing gear is extended, to a bracket 26 carried by a nut 27. The nut engages a lead screw 28 extending substantially vertically in the plane of symmetry of the aircraft. This lead screw 28 is rotatable in suitable bearings 29 and 30 fixed to the aircraft structure, and means 31 comprising a pair of bevel gears and suitable apparatus operable by the pilot, serves to turn the lead screw whereby the nut 27 may be translated upwardly therealong. It will thus be apparent that by turning the lead screw in one direction, the nut 27 is traversed to the bottom of the screw, thus extending the strut 24 and the member 18 to a position below the aircraft body, in which position the wheel 23 is in an attitude for ground contact. Upon rotation of the lead screw in the opposite direction, the nut 27 is drawn upwardly along the screw, whereupon the strut 24 and the member 18 are likewise drawn upwardly and inwardly to an ultimate retracted position. In this latter position, the strut 24, the wheel 23 and the yoke 21 are contained wholly within the fuselage 10, and the member 18 lies substantially horizontal and in front of and parallel to the leading edge of the wing 12. A fairing 32 may be attached to the member 18 and may be so formed that when the landing gear is in its retracted position, the fairing forms a continuation of the airfoil contour, effecting a satisfactory entering or leading edge for the wing at that portion of the wing where the member 18 lies.

It will be apparent to those skilled in the art that a cutout might be made in the leading edge of the wing to accommodate the member 18 when retracted, and that it is unnecessary for said member to project forwardly of the normal leading edge. It will likewise be apparent that the fuselage 10 as shown and described, might readily be an outboard engine nacelle rather than the fuselage per se, and that duplicate retracting mechanisms including the lead screw 28 or its equivalent, may be incorporated in such outboard engine nacelles in order to take care of retraction of both units of the landing gear. It is also conceivable that the wheel may be retracted within the wing, rather than within the fuselage or the engine nacelle, and suitable recesses would normally be provided in either the fuselage nacelle or wing, so that the wheels lie wholly within the contour of the outer surface of the containing elements.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In aircraft having a wing, a retractable landing gear having a strut swingable in a plane forward of the wing leading edge on an axis substantially parallel to a chord of said wing and passing through said wing, said strut in the extended landing gear position being organized to depend from the leading edge of said wing, and in the retracted landing gear position being organized to lie close to, and form a part of the leading edge of said wing.

2. In aircraft having a body and a wing extending therefrom, said body having an opening adjacent the leading edge of said wing, a fore and aft shaft journaled in said wing and extending from the leading edge thereof, a landing gear strut carried at the forward end of said shaft, a wheel carried at the outer end of said strut, and means for turning said strut and wheel between an extended position below said wing and a retracted position wherein said strut lies along the leading edge of said wing and said wheel lies within said body opening.

3. In aircraft having a wing, a bearing having a fore and aft axis carried by the structural members of said wing, a shaft journaled in said bearing and extending forwardly of the leading edge of the wing, a landing gear member mounted at the forward end of and substantially at a right angle to said shaft, means for moving said member from a position below said wing to a position adjacent and parallel to the leading edge of said wing, and a ground contact element carried by said member.

4. In aircraft having a wing, a retractable landing gear including a strut hinged to the leading edge of said wing and adapted when the landing gear is retracted to lie along and forward of said leading edge and outside the confines of said wing.

5. In aircraft having a wing, a retractable landing gear including a strut hinged to the leading edge of said wing and adapted when the landing gear is retracted to lie along said leading edge and outside the confines of said wing, and a fairing carried by said strut and profiled to form the leading portion of the wing profile when said strut lies along the leading edge of said wing.

6. In aircraft having a wing, a landing gear strut hinged to the leading edge of the wing, movable from a position below said wing to a position adjacent, parallel to and forward of the leading edge of said wing.

7. In aircraft having a wing, a landing gear strut hinged to the leading edge of the wing, movable from a position below said wing to a position adjacent, parallel to and forward of the leading edge of said wing, and a fairing carried by said strut formed to blend with the wing profile when said strut lies along and forward of the leading edge of said wing.

COLBY W. STEWARD.